(12) United States Patent
Tian et al.

(10) Patent No.: US 11,355,037 B2
(45) Date of Patent: Jun. 7, 2022

(54) LED DISPLAY SCREEN AND DISPLAY DEVICE

(71) Applicant: SHENZHEN AOTO ELECTRONICS CO., LTD., Shenzhen (CN)

(72) Inventors: Jingsong Tian, Shenzhen (CN); Zhenzhi Wu, Shenzhen (CN); Kunpeng He, Shenzhen (CN); Hanqu Wu, Shenzhen (CN)

(73) Assignee: SHENZHEN AOTO ELECTRONICS CO., LTD., Shenzhen (CN)

( * ) Notice: Subject to any disclaimer, the term of this patent is extended or adjusted under 35 U.S.C. 154(b) by 291 days.

(21) Appl. No.: 16/634,112

(22) PCT Filed: Jul. 17, 2018

(86) PCT No.: PCT/CN2018/095888
§ 371 (c)(1),
(2) Date: Jan. 24, 2020

(87) PCT Pub. No.: WO2019/047619
PCT Pub. Date: Mar. 14, 2019

(65) Prior Publication Data
US 2020/0211426 A1    Jul. 2, 2020

(30) Foreign Application Priority Data

Sep. 7, 2017 (CN) .......................... 201710802086.3

(51) Int. Cl.
*G09F 9/33* (2006.01)
*G09G 3/32* (2016.01)
(Continued)

(52) U.S. Cl.
CPC ................ *G09F 9/33* (2013.01); *G09G 3/32* (2013.01); *H01R 13/187* (2013.01); *H01R 13/5213* (2013.01); *H01R 13/6215* (2013.01)

(58) Field of Classification Search
CPC .......... G09F 9/33; G09G 3/32; H01R 13/187; H01R 13/5213; H01R 13/6215
See application file for complete search history.

(56) References Cited

U.S. PATENT DOCUMENTS

2009/0116235 A1    5/2009   Tsao et al.
2012/0086648 A1*   4/2012   Leung .................. G06F 1/1626
                                                                345/173
2014/0301088 A1   10/2014   Lu et al.

FOREIGN PATENT DOCUMENTS

CN         1296652 A       5/2001
CN       201069628 Y       6/2008
(Continued)

*Primary Examiner* — Anne M Hines (57) ABSTRACT

An LED display screen, includes: a frame, modules disposed at a side of the frame and including an LED light board, and a non-display surface of the LED light board is provided with a first socket configured to be connected with a board-to-board connector; and a power box disposed inside the frame and located between the modules, with a control board connected with the LED light board via the board-to-board connector; wherein the control board comprises a main control board and at least one sub-control board, a surface of the sub-control board facing a surface of the LED light board is provided with a second socket configured to match with the first socket, each of the sub-control boards is fixed by an elastic mechanism and a bottom surface of the power box opposite to the LED light board.

10 Claims, 5 Drawing Sheets

(51) Int. Cl.
*H01R 13/187* (2006.01)
*H01R 13/52* (2006.01)
*H01R 13/621* (2006.01)

(56) References Cited

FOREIGN PATENT DOCUMENTS

| | | | |
|---|---|---|---|
| CN | 102402908 | A | 4/2012 |
| CN | 103137031 | A | 6/2013 |
| CN | 103886811 | A | 6/2014 |
| CN | 204332282 | U | 5/2015 |
| CN | 103730068 | B | 2/2017 |
| CN | 107038965 | A | 8/2017 |
| CN | 207602152 | U | 7/2018 |
| EP | 0730185 | A2 | 9/1996 |
| EP | 1133014 | A2 | 9/2001 |
| WO | 2007116117 | A1 | 10/2007 |

\* cited by examiner

LED DISPLAY SCREEN AND DISPLAY DEVICE

CROSS REFERENCE TO RELATED APPLICATION

The present application is a 35 U.S.C. § 371 national stage application of PCT Application Ser. No. PCT/CN2018/095888 filed on Jul. 17, 2018, which claims priority to Chinese Patent Application Ser. No. CN201710802086.3 filed on Sep. 7, 2017, the entire contents of which are incorporated herein by reference in their entireties.

TECHNICAL FIELD

The present application relates to the technical field of display, and more particularly to an LED display screen and a display device.

BACKGROUND

In the prior art, the connection of the LED display module and the control board provided in the power box usually includes the following two methods:

In a first method, the LED module is provided with a cable socket, and the module and the control board are connected by a cable. However, this design structure is not compact, especially when outdoor use, the module and the control board must be considered to be waterproof and the cable joint needs to be covered with rubber, this results in a complex structure and high cost, which makes it impossible to quickly maintain and replace the module. In general, this connection method is very rarely used.

In a second method, one part of a board-to-board connector (assuming a female end of connector) is disposed at the rear surface of the light board of the module, and a large control board is disposed in the control power box, and the other part of the board-to-board connector (assuming a male end of connector) is disposed on the control board. This structure realizes the cable-free connection between the control board and the module, and the structure is simple and convenient for the module to be quickly disassembled. However, this connection method has a fatal disadvantage when used on the stadium screen, that is, when the LED light board of the LED display screen is impacted by objects such as football at a speed of about 100 kilometers per hour, the LED light board will backward deform, which then causes the part of the board-to-board connector soldered to the LED light board to move backwards, and causing the contacts of the board-to-board connector to be detached (or the contact is unreliable), and causing the LED screen to flicker (that is, an instant black screen). Although the shape of the LED light board will return to the original state after the football leaves, the LED display will also display normally, but this flicker seriously affects the audience's viewing experience, which may make the audience unhappy, and the lifetime of the board-to-board connector is shortened, which requires frequent replacement of the board-to-board connector.

SUMMARY

The present application provides a LED display screen and a display device, in order to overcome the problem in the prior art that, when the LED light board is impacted by objects such as football, the contactor connecting the control board and the board-to-board connector of the module is disengaged, and causing instant black screen in the prior art.

In order to solve the technical problem above mentioned, the technical solution provided in the present application is as follows:

An LED display screen, including:

a frame, configured to assemble modules and a power box; the modules are disposed at a side of the frame and including an LED light board, and a non-display surface of the LED light board is provided with a first socket configured to be connected with a board-to-board connector; the power box is disposed inside the frame and located between the modules, a bottom surface inside of the power box is provided with a control board connected with the LED light board via the board-to-board connector;

the control board includes a main control board and at least one sub-control board, the sub-control board and the main control board are spaced from each other and connected via a cable, a surface of the sub-control board facing toward the LED light board is provided with a second socket configured to match with the first socket, each of the sub-control boards is fixed by an elastic mechanism to a bottom surface of the power box opposite to the LED light board, the elastic mechanism is configured such that the modules and the sub-control board are moved synchronously in a direction facing away from a display surface of the LED light board, when the display surface is impacted, while remaining relative positions of the contacts of the first socket and the second socket unchanged.

In order to solve the technical problem above mentioned, another technical solution provided in the present application is as follows:

A display device, including: the LED display screen and a mounting bracket.

In the present application, the control board is divided into a main control board and at least one sub-control board and the LED light board and the sub-control board are connected by the board-to-board connector, and the elastic mechanism is disposed between the sub-control board and the power box, the elastic mechanism can synchronously move the module and the sub-control boards in a direction facing away from the display surface of the LED light board, when the display surface is impacted, while remaining the relative positions of the contacts of the first socket and the second socket unchanged. The present application can make the LED light board avoiding the bad phenomenon such as black screen when being impacted by objects such as football.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

DESCRIPTION OF THE ENABLING EMBODIMENT

In order to enable those skilled in the art to better understand the solutions of the present application, the technical solutions in the embodiments of the present application will be clearly described below with reference to the accompanying drawings in the embodiments of the present application. Obviously, the described embodiments are a part of the embodiment, but not all embodiments of the present application. Based on the embodiments of the present application, all other embodiments obtained by a person of ordinary skill in the art without creative efforts should fall within the protection scope of the present application.

The term "comprising" and any variants thereof in the description and claims of the present application and the above-mentioned drawings are intended to cover non-exclusive inclusion. For example, a process, method, or system, product, or device containing a series of steps or units is not limited to the listed steps or units, but optionally also includes steps or units not listed, or optionally Other steps or units inherent to these processes, methods, products or equipment. In addition, the terms "first", "second", "third", and the like are used to distinguish different objects and are not used to describe a specific order.

Embodiment 1

Please refer to FIGS. 1 to 5. As can be seen from FIGS. 1 to 5, an LED display screen 100 of the present invention includes a frame 10, modules 20, and a power box 30 assembled together. The number of the modules 20 is multiple, and the number of the power boxes 30 is optionally two.

The frame 10 is configured for assembling the modules 20 and the power box 30. The modules 20 are disposed on one side of the frame 10, and the module 20 includes an LED light board 21, a non-display surface of the LED light board 21 is provided with a first socket 211 connected with a board-to-board connector. The board-to-board connector includes a plug and a socket that are mated with each other. The first socket 211 is a plug or a socket, and preferably a socket.

Figure 1:
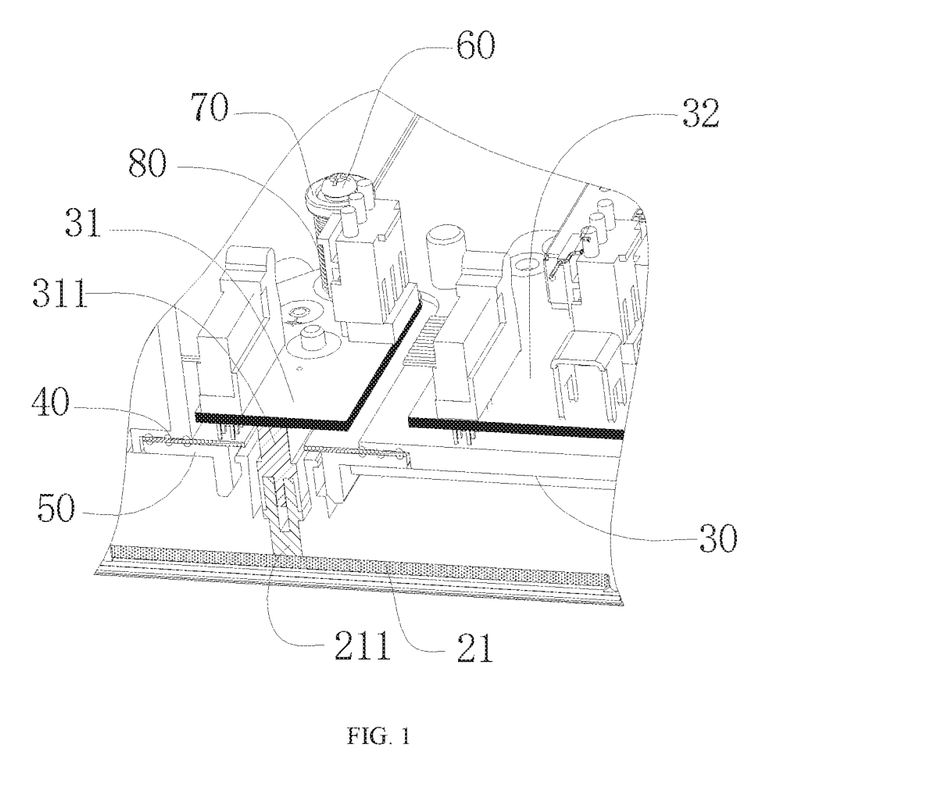
FIG. 1 is a partial section view of an embodiment of an LED display screen according to the present application, wherein the sub-control board, the elastic mechanism and the LED light board are connected by the board-to-board connector.
Figure 4:
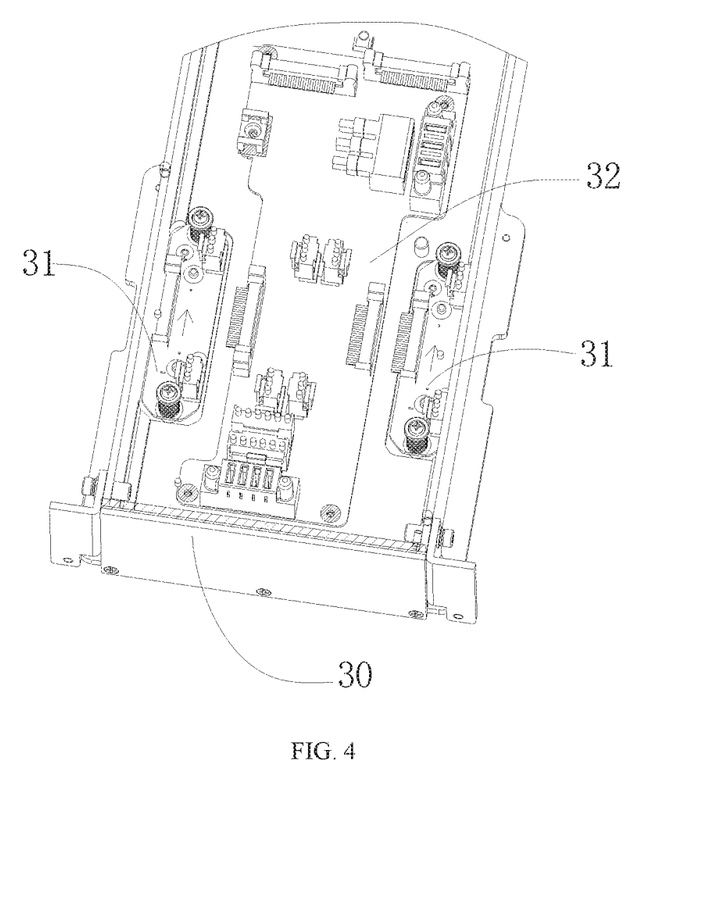
FIG. 4 is a distribution schematic view of the main control board and the sub-control boards in the power box of an embodiment of an LED display screen according to the present application.
Figure 5:
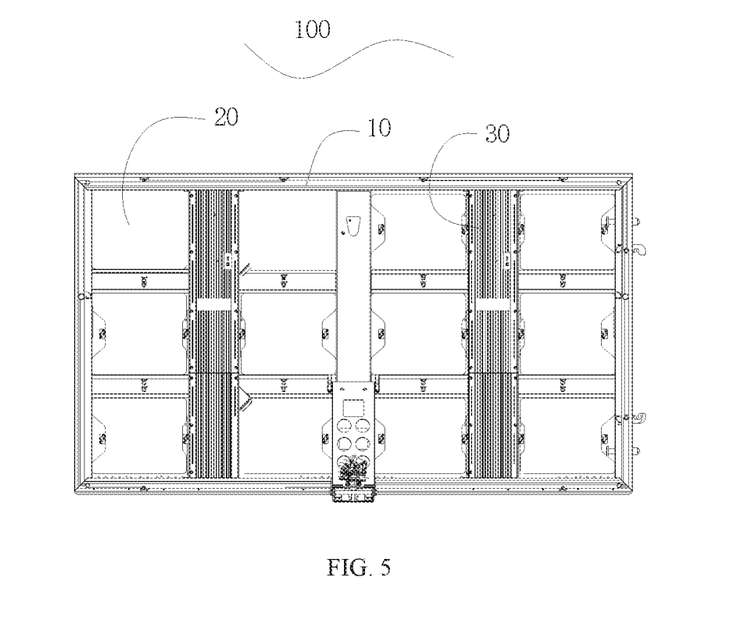
FIG. 5 is a schematic view of an overall appearance of an embodiment of an LED display screen according to the present application.

Among then, the power box 30 is disposed inside the frame 10 and between the modules 20, and a bottom surface of the power box 30 is provided with a control board connected with the LED light board 21 through the board-to-board connector.

The control board includes a main control board 32 and at least one sub-control board 31, the sub-control board 31 is spaced from the main control board 32 and connected via a cable, a surface of the sub-control board 31 facing a surface of the LED light board 21 is provided with a second socket 311 (that is the plug of the board-to-board connector) configured to match with the first socket 211, each of the sub-control boards 31 is fixed by an elastic mechanism to a bottom surface of the power box 30 opposite to the LED light board 21, the elastic mechanism is configured such that the modules 20 and the sub-control board are moved synchronously in a direction facing away from a display surface, when the display surface of the LED light board 21 is impacted, while remaining relative positions of the contacts of the first socket and the second socket unchanged.

Specifically, in this embodiment, optionally, the elastic mechanism includes a screw 60, a floating limiting sleeve 70, and an elastic structure, the sub-control board 31 is provided with a circular hole 312 configured to match with the screw 60, the screw 60 passes through the circular hole 312, and a tail portion of the screw is fixed at a bottom surface of the power box 30 opposite to the LED light board 21, the floating limiting sleeve 70 and the elastic structure are disposed between a head portion of the screw 60 and the sub-control board 31, and the floating limiting sleeve is disposed between the head portion and the elastic structure. In this embodiment, optionally, the elastic structure is a metal spring 80, and two ends of the metal spring 80 are in contact with the sub-control board 31 and the floating limiting sleeve 70, respectively. The diameter of the metal spring 80 is larger than the diameter of the circular hole 312. When the metal spring 80 is compressed to its limit, the cable connected the main control board 32 and the sub-control board 31 is still in a slack state, that is the cable will not be tighten due to the backwards movement of the sub-control board 31, and will not cause the contacts between the cable and the main control board 32 or the sub-control board 31 being detached to result in poor contact.

In the embodiment, the screw 60 is perpendicular to the sub-control board 31 and the bottom surfaces of the power supply box 30 opposite to the LED light board 21, and the head portion of the screw 60 blocks the floating limiting sleeve 70. The inner diameter of the floating limiting sleeve 70 is smaller than the inner diameter of the spring 80. The floating limiting sleeve 70 is configured to block the spring 80. The tail portion of the screw 60 is screwed into the bottom surface of the power box 30 opposite to the LED light board 21 and fixed on the bottom surface. When the LED light board 21 is moved backward by an impact, the LED light board 21 pushes the sub-control board 31 to move backward through the board-to-board connector, and then pushes the spring 80 to move backward, and the spring 80 is blocked by the floating limiting sleeve 70 and the head portion of the screw 60 to form a compressed state. When the impact is end, the spring 80 relies on its own elastic force to return to its original state, and pushes the sub-control board 31 forward (that is, moving toward the direction of the LED light board 21), and both the sub-control board 31 and the LED light board 21 are restored to the original position and status.

In this embodiment, optionally, there is at least two elastic structures, and at least two elastic structures are disposed symmetrically on the sub-control board 31. This design is to make the sub-control board 31 have a plurality of fulcrum points such that it can maintain a balanced and stable state during the moving.

In this embodiment, surfaces of the screw 60 and the metal spring 80 can be optionally provided with a rust-proof coating to prevent oxidation and rust, which affecting the lifetime. Since the metal spring 80 will cause its elastic force to fail after rusting, and the rusting may affect the metal spring 80 pushing the sub-control board 31 and the LED light board 21 back to their original positions.

In this embodiment, a plurality of the sub-control boards 31 are provided, which are provided at peripheral edges of the main control board 32, and the sub-control boards 31 and the main control board 32 are able to match into a rectangle. It should be noted that the rear side of the LED light board 21 is further provided with first sockets 211 corresponding to the sub-control boards 31.

Figure 2:
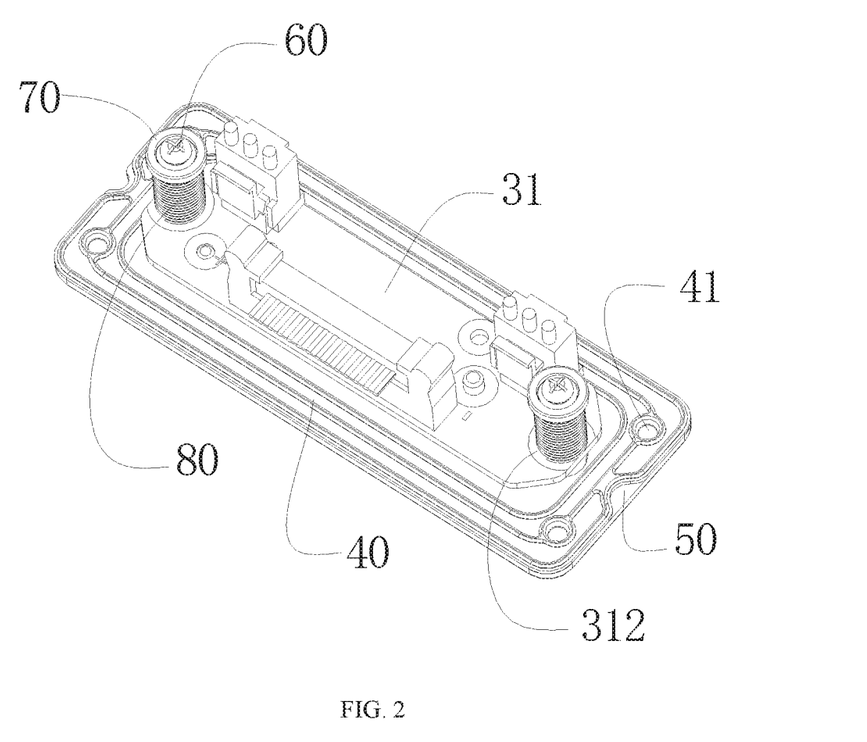
FIG. 2 is a front view of an embodiment of an LED display screen according to the present application, wherein the sub-control board, the waterproof ring and the waterproof cover are assembled as one piece by the elastic mechanism.
Figure 3:
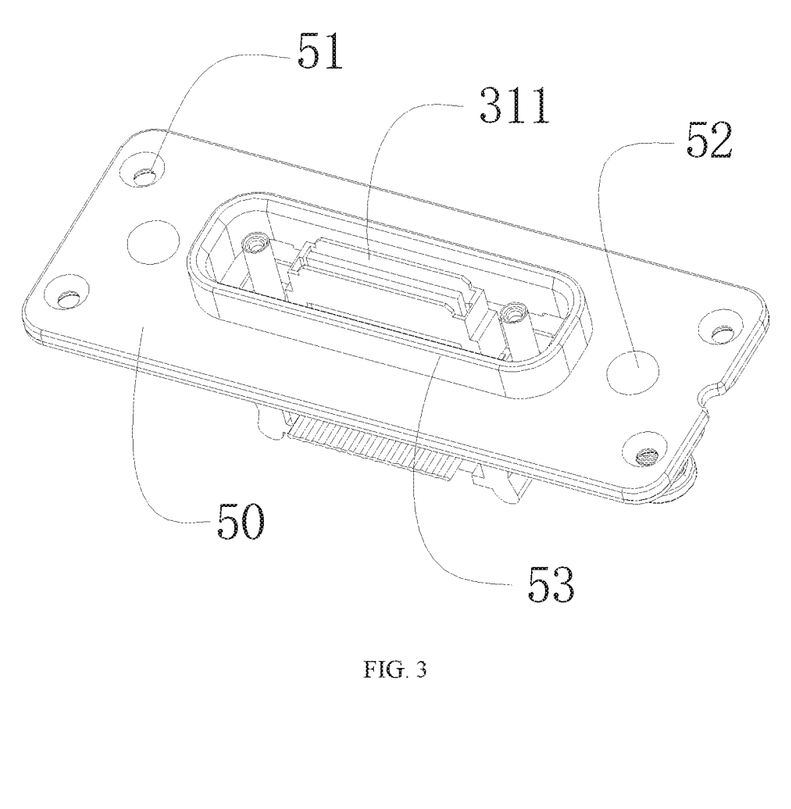
FIG. 3 is a rear view of an embodiment of an LED display screen according to the present application, wherein the sub-control board, the waterproof ring and the waterproof cover are assembled as one piece by the elastic mechanism.

In this embodiment, a surface of the sub-control board 31 fixed with the power box 30 is provided with a waterproof cover 50 and a waterproof ring 40, and the waterproof cover 50 is disposed between the waterproof ring 40 and the sub-control board 31.

In this embodiment, optionally, the peripheral edge of the waterproof ring 40 is provided with first fixing holes 41 configured to be fixed to the power box 30 and first threaded holes (not shown in the figure) configured to match with the screws 60, the peripheral edge of the waterproof sleeve 50 is provided with second fixing holes 51 configured to be fixed to the power box 30 and second threaded holes 52 configured to be mated with the screws 60, the first threaded holes and the second threaded holes 52 are overlapped, and the screws 60 are screwed in and passes through the first threaded holes and the second threaded holes 52 to be fixed to the power box 30.

In this embodiment, optionally, a middle portion of the waterproof sleeve 50 and the waterproof ring 40 may be provided with a positioning groove 53 that cooperates with the second socket 311. The second socket 311 passes through the positioning groove 53 to be connected with the first socket 211.

The working principle of the present application is as follows:

Generally, when flying objects such as footballs hit the LED light board 21, their speed can usually reach 100 km/h, and the weight of the LED light board 21 is much greater than that of the sub-control board 31 and the spring 80, when the football is hit the LED light board 21, the first socket 211 of the board-to-board connector on the LED light board 21 will push the second socket 311 on the sub-control board 31, and then push the sub-control board 31 to move backward quickly, and the sub-control board 31 quickly compresses the spring 80 and moves backward. In this process, since the sub-control board 31 can move backward by compressing the spring 80 and move rapidly backward, the relative positions of the contacts of the first socket 211, while remaining second socket 311 of the board-to-board connector unchanged, such that when the LED light board 21 is impacted by an object such as a football, the black screen will not appear due to the relative positions of the contacts of the first socket 211 and the second socket 311 being detached.

In the present application, the control board is divided into a main control board 32 and at least one sub-control board 31, and the LED light board 21 and the sub-control board 31 are connected by the board-to-board connector, and the elastic mechanism is disposed between the sub-control board 31 and the power box 30, the elastic mechanism can synchronously move the module and the sub-control boards 31 in a direction facing away from the display surface when the display surface of the LED light board 21 is impacted, while remaining relative positions of the contacts of the first socket 211 and the second socket 311 unchanged. The present application can make the LED light board 21 avoiding the bad phenomenon such as black screen when being impacted by objects such as football.

Embodiment 2

Figure 6:
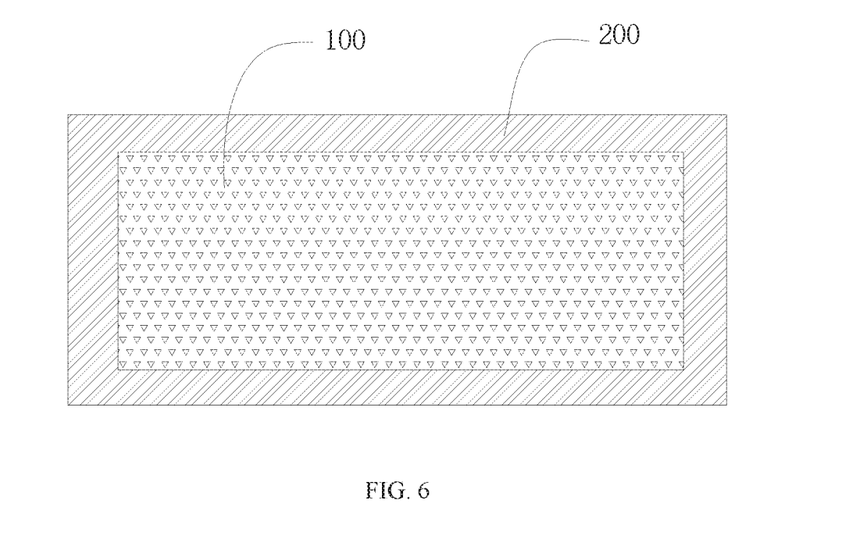
FIG. 6 is a partial structural view of an embodiment of a display device according to the present application.

As shown in FIG. 6, the present embodiment provides a display device 200, the display device 200 includes the LED display screen 100 of embodiment 1 and a mounting bracket (not shown in figures). Due that the LED display screen 100 has been described in detail in embodiment 1, which is not described herein.

In the present application, the control board is divided into a main control board 32 and at least one sub-control board 31 and the LED light board 21 and the sub-control board 31 are connected by the board-to-board connector, and the elastic mechanism is disposed between the sub-control board 31 and the power box 30, the elastic mechanism can synchronously move the module and the sub-control boards 31 in a direction facing away from the display surface when the display surface of the LED light board 21 is impacted, while remaining relative positions of the contacts of the first socket 211 and the second socket 311 unchanged. The present application can make the LED light board 21 avoiding the bad phenomenon such as black screen when being impacted by objects such as football.

The aforementioned embodiments are only preferred embodiments of the present application. For one of ordinary skill in the art, according to the thought of the present application, specific implementation modes and application scopes may be modified, and the content of the specification should not be interpreted as any limitation to the present application.

What is claimed is:

1. An LED display screen, characterized in that, comprising:
   a frame, configured to assemble modules and a power box;
   the modules are disposed at a side of the frame and comprising an LED light board, wherein a non-display surface of the LED light board is provided with a first socket configured to be connected with a board-to-board connector;
   the power box is disposed inside the frame and located between the modules, wherein a bottom surface inside of the power box is provided with a control board connected with the LED light board via the board-to-board connector;
   wherein the control board comprises a main control board and at least one sub-control board, the sub-control board and the main control board are spaced from each other and connected via a cable, a surface of the sub-control board facing toward the LED light board is provided with a second socket configured to match with the first socket, each of the sub-control boards is fixed by an elastic mechanism and a bottom surface of the power box opposite to the LED light board, the elastic mechanism is configured such that the modules and the sub-control board are moved synchronously in a direction facing away from a display surface of the LED light board, when the display surface is impacted, while remaining relative positions of contacts of the first socket and the second socket unchanged.

2. The LED display screen according to claim 1, wherein the elastic mechanism comprises a screw, a floating limiting sleeve, and an elastic structure, the sub-control board is provided with a circular hole configured to match with the screw, the screw passes through the circular hole, and a tail portion of the screw is fixed at a bottom surface of the power box opposite to the LED light board, the floating limiting sleeve and the elastic structure are disposed between a head portion of the screw and the sub-control board, and the floating limiting sleeve is disposed between the head portion and the elastic structure.

3. The LED display screen according to claim 2, wherein the number of the elastic structure is at least two, and the at least two elastic structures are disposed symmetrically on the sub-control board.

4. The LED display screen according to claim 2, wherein the elastic structure is a metal spring, and two ends of the metal spring respectively are in contact with the sub-control board and the floating limiting sleeve, and the cable connected the main control board and the sub-control board is still in a relaxed state, when the metal spring is compressed to its limit.

5. The LED display screen according to claim 4, wherein surfaces of the screw and the metal spring are provided with a rust-proof coating.

6. The LED display screen according to claim 1, wherein a plurality of the sub-control boards are provided, which are arranged at peripheral edges of the main control board, and the sub-control boards and the main control board are able to match into a rectangle.

7. The LED display screen according to claim 1, wherein a surface of the sub-control board fixed with the power box is provided with a waterproof cover and a waterproof ring, and the waterproof ring is disposed between the waterproof cover and the sub-control board.

8. The LED display screen according to claim 7, wherein peripheral edges of the waterproof sleeve and the waterproof ring are provided with fixing holes configured to be fixed with power box and threaded holes configured to match with the screws, the screws are screwed in and passes through the threaded holes to be fixed with the power box.

9. The LED display screen according to claim 7, wherein a middle portion of the waterproof sleeve and the waterproof ring is provided with a positioning groove configured for matching with the second socket, and the second socket passes through the positioning groove and connects with the first socket.

10. A display device, comprising the LED display screen according to claim 1 and a mounting bracket.

\* \* \* \* \*